(12) United States Patent
Lee et al.

(10) Patent No.: US 12,434,972 B2
(45) Date of Patent: Oct. 7, 2025

(54) BORON-DOPED CARBON NANOTUBES SYNTHESIZED BY ARC DISCHARGE AND METHOD OF MANUFACTURING THE SAME

(71) Applicant: INDUSTRY-ACADEMIA COOPERATION GROUP OF SEJONG UNIVERSITY, Seoul (KR)

(72) Inventors: Nae Sung Lee, Seoul (KR); Syed Muhammad Zain Mehdi, Seoul (KR)

(73) Assignee: INDUSTRY-ACADEMIA COOPERATION GROUP OF SEJONG UNIVERSITY (KR)

( * ) Notice: Subject to any disclaimer, the term of this patent is extended or adjusted under 35 U.S.C. 154(b) by 724 days.

(21) Appl. No.: 17/847,150

(22) Filed: Jun. 22, 2022

(65) Prior Publication Data

US 2023/0039609 A1 Feb. 9, 2023

(30) Foreign Application Priority Data

Jun. 28, 2021 (KR) .................. 10-2021-0083822
Jun. 2, 2022 (KR) .................. 10-2022-0067320

(51) Int. Cl.
*C01B 32/16* (2017.01)
*B01J 19/08* (2006.01)
*B82Y 40/00* (2011.01)

(52) U.S. Cl.
CPC ............ *C01B 32/16* (2017.08); *B01J 19/088* (2013.01); *B01J 2219/0839* (2013.01); *B01J 2219/0845* (2013.01); *B82Y 40/00* (2013.01); *C01B 2202/06* (2013.01); *C01B 2202/22* (2013.01); *C01B 2202/36* (2013.01); *C01P 2002/04* (2013.01); *C01P 2002/54* (2013.01); *C01P 2002/82* (2013.01); *C01P 2004/03* (2013.01); *C01P 2004/04* (2013.01); *C01P 2006/80* (2013.01)

(58) Field of Classification Search
CPC . C01B 32/16; C01B 2202/06; C01B 2202/22; C01B 2202/36; B82Y 40/00; C01P 2002/54; C01P 2002/82; C01P 2002/04; C01P 2006/80; B01J 19/088; B01J 2219/0845; B01J 2219/0839
See application file for complete search history.

(56) References Cited

FOREIGN PATENT DOCUMENTS

JP 2022-089358 * 6/2022

OTHER PUBLICATIONS

Vieira et al, "Effect of growth conditions on B-doped carbon nanotubes", J. Mater. Res., vol. 21, No. 12, Dec. 2006, pp. 3058-3064.*

* cited by examiner

*Primary Examiner* — C Melissa Koslow
(74) *Attorney, Agent, or Firm* — Renaissance IP Law Group LLP (57) ABSTRACT

Disclosed are a multi-wall carbon nanotube (MWCNT) formed using arc discharge and a method for manufacturing the same. The carbon source of the anode and boron that is the doping source, are evaporated through arc discharge and then deposited on the surface of the cathode to form MWCNTs, and boron is evenly distributed in the multi-walls of the MWCNTs. Therefore, the outer diameter of the MWCNT is reduced, high thermal stability is secured, and the effect of improving the field emission characteristics can be obtained.

12 Claims, 10 Drawing Sheets

BORON-DOPED CARBON NANOTUBES SYNTHESIZED BY ARC DISCHARGE AND METHOD OF MANUFACTURING THE SAME

TECHNICAL FIELD

The present inventive concept relates to boron-doped carbon nanotubes, and more specifically, to boron-doped carbon nanotubes synthesized by arc discharge method and a method of manufacturing the boron-doped carbon nanotubes.

BACKGROUND ART

Carbon nanotube has a tube-shaped structure composed of carbon atoms, has a high aspect ratio of length to diameter, and is a material with high conductivity. Carbon nanotubes are applied in various fields due to their high thermal and chemical stability.

Methods for synthesizing carbon nanotubes include arc discharge method, laser deposition method, and chemical vapor deposition method.

In the laser deposition method, a target in which a metal and graphite powder are mixed is used, and a process in which a laser is irradiated to the target is used. In the laser deposition method, if the target is pure graphite, multi-wall carbon nanotubes (MWCNTs) are formed, and when a transition metal is mixed and acts as a catalyst, single-wall carbon nanotubes are formed.

In addition, in the chemical vapor deposition method, hydrocarbon gas and a metal catalyst are used, carbon and hydrogen are generated by heat or plasma, and then carbon nanotubes are formed by deposition and the action of the metal catalyst.

In the arc discharge method, an arc discharge occurs when a voltage is applied between two graphite electrodes and current flows between two electrodes. By this arc discharge, the graphite electrode of the anode is evaporated to form carbon vapor, and the carbon vapor is condensed on the surface of graphite electrode of cathode having a relatively low temperature to form a carbon soot. This carbon deposit contains carbon nanotubes and carbonaceous impurities. Carbon nanotubes synthesized without a catalyst have a structure of MWCNTs.

The synthesized carbon nanotubes can be applied to various fields and can be used as an electron emission material. The electron emission material needs to have high electrical conductivity and small diameter. Even when the same voltage is applied, a relatively high electric field is induced at the ends of the carbon nanotubes having a small diameter when the lengths are the same. Accordingly, the electron emission ability is improved.

In order to reduce the diameter of the carbon nanotubes, a technique for doping the carbon nanotubes with an impurity element having a size different from that of carbon is introduced. A typical impurity element is boron (B). The atomic diameter of carbon is 140 pm, whereas the atomic diameter of boron is 170 pm, which is 1.2 times larger than that of carbon. When boron is added during the synthesis of carbon nanotubes, boron is doped as a substitutional defect that replaces carbon atoms in the crystal structure of the carbon nanotubes, and the doped boron interferes with the synthesis of carbon nanotubes. So, it is expected that the diameter of the carbon nanotubes will be reduced.

Japanese Patent No. 5911051 discloses a technique in which boron is doped into carbon nanotubes. In the above patent, prepared carbon nanotubes and $B_4C$ powder are mixed, and then sintering is performed using discharge plasma. In the mixed powder raised to a high temperature by the discharge plasma, boron replaces the carbon atoms of the carbon nanotubes to complete the doping process.

The above patent uses the principle of introducing boron atoms of the $B_4C$ powder into the preformed carbon nanotubes using a high temperature. However, there is a problem in that boron is not evenly doped depending on the state of the mixed powder. In addition, in the case of MWCNTs, only the surface is doped, and there is a disadvantage in that doping is not made on the inside of carbon nanotubes.

Therefore, a technology capable of evenly doping the carbon nanotubes with boron and controlling the diameter of the carbon nanotubes through boron doping during the synthesis process is still required.

DISCLOSURE

Technical Problem

The present disclosure is directed to providing a MWCNT of which outer diameter is controlled by doping an impurity element using an arc discharge.

In addition, the present disclosure is directed to providing a method for manufacturing a MWCNT of which outer diameter is controlled.

Technical Solution

One aspect of the present inventive concept provides multi-walled carbon nanotubes (MWCNTs) doped with boron and having a reduced outer diameter compared to an undoped carbon nanotubes, wherein the outer diameter has a value of 4 nm to 20 nm.

The other aspect of the present inventive concept provides a method of manufacturing MWCNTs comprising generating an arc discharge by applying a voltage between anode and cathode spaced apart from each other; evaporating carbon vapor and boron vapor at the anode close to the cathode by the arc discharge; and forming boron-doped carbon nanotubes by depositing the carbon vapor and the boron vapor on surface of the cathode.

Advantageous Effects

According to the present inventive concept described above, the diameter of the boron-doped carbon nanotubes can be adjusted depending on the concentration of boron doped during the synthesis process. In addition, a high oxidation peak temperature is secured, so that strong physical properties can be maintained even in a high temperature environment. In particular, when used as an electron emission material, the outer diameter of the carbon nanotubes needs to be reduced in order to generate a high electric field. According to the present inventive concept, the change in the boron doping concentration is a control factor of the outer diameter of the carbon nanotubes. Through controlling the outer diameter of the carbon nanotubes, a high electric field may be formed to perform an excellent electron emission operation.

DETAILED DESCRIPTION

While the present inventive concept is subject to various modifications and alternative embodiments, specific embodiments thereof are shown by way of example in the accompanying drawings and will be described. However, it should be understood that there is no intention to limit the present inventive concept to the particular embodiments disclosed, but on the contrary, the present inventive concept is to cover all modifications, equivalents, and alternatives falling within the spirit and scope of the present inventive concept. Like numbers refer to like elements throughout the description of the figures.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present inventive concept will be described with reference to the accompanying drawings in detail.

Embodiment

Figure 1:
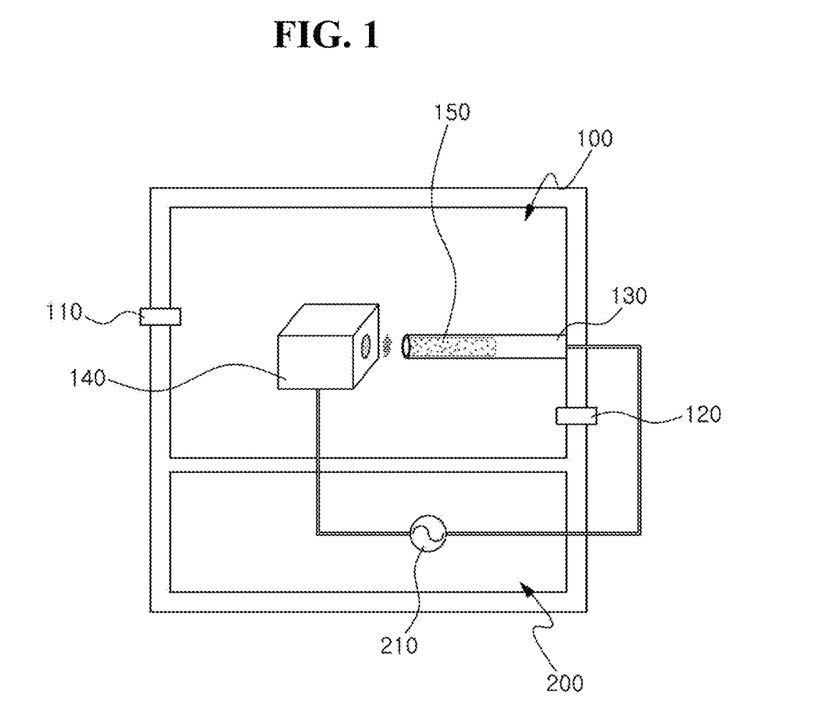
FIG. 1 is schematic diagram showing equipment for manufacturing boron-doped carbon nanotubes according to preferred embodiment of the present inventive concept.

FIG. 1 is schematic diagram showing equipment for manufacturing boron-doped carbon nanotubes according to preferred embodiment of the present inventive concept.

Referring to FIG. 1, the manufacturing equipment has a process chamber 100 and a power chamber 200. An anode 130 and a cathode 140 are disposed in the process chamber 100. In addition, the atmospheric gas inlet 110 and the atmospheric gas outlet 120 may be formed at predetermined positions of the process chamber 100. For example, the atmospheric gas inlet 110 may be disposed on a side surface of the process chamber 100. The anode 130 and the cathode 140 are made of a graphite, and can rotate relative to each other. For example, the anode 130 may rotate and the cathode 140 may be fixed, and the cathode 140 may rotate and the anode 130 may rotate. Of course, the anode 130 and the cathode 140 may be fixed without rotation. In addition, the interval between the anode 130 and the cathode 140 may be adjusted according to the progress of the process so that carbon nanotubes are synthesized in the cathode 140. At the anode 130 made of a graphite, a hole is formed from a distal end portion facing the cathode 140 to a predetermined depth. In present embodiment, the anode 130 has a circular cross section with a diameter of 8 mm, and a hole is formed along the center in the longitudinal direction of the anode 130. A mixed powder 150 of graphite powder and boron powder is filled in the hole. When a voltage is applied between the anode 130 and the cathode 140 through the power source 210 disposed in the power chamber 200, a current flows and arc discharge is generated. When an arc discharge occurs, the temperature of the arc discharge may exceed 3000° C. Therefore, as the graphite of the anode is evaporated, the mixed powder 150 of graphite powder and boron powder filled in the hole is also evaporated to make carbon vapor and boron vapor, and then, carbon nanotubes are formed on the surface of the cathode 140 having a relatively low temperature. The formed carbon nanotubes are doped in a state where boron substitutes carbon in the crystal structure. Through this, boron-doped carbon nanotubes are formed.

Figure 2:
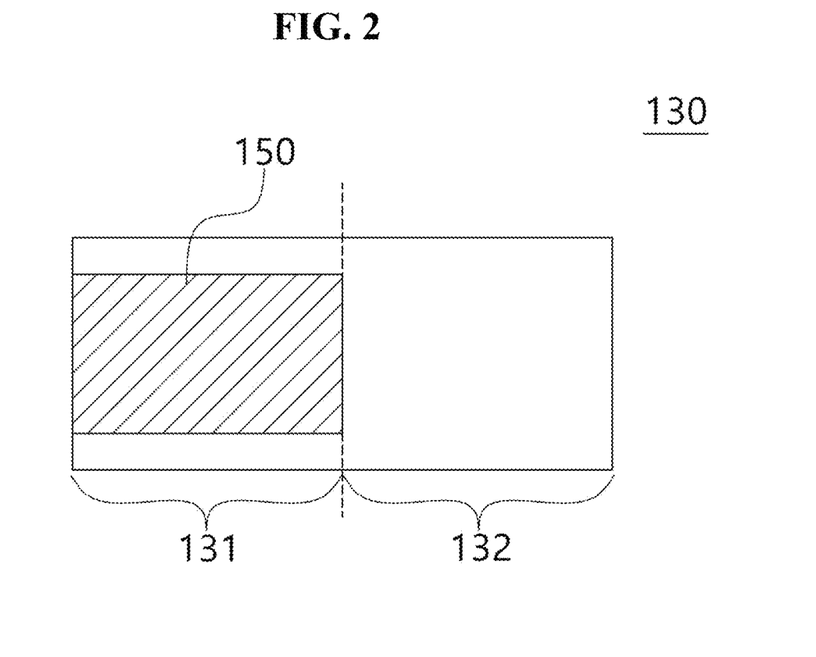
FIG. 2 is a cross-sectional view illustrating the anode of FIG. 1 according to a preferred embodiment of the present inventive concept.

FIG. 2 is a cross-sectional view illustrating the anode of FIG. 1 according to a preferred embodiment of the present inventive concept.

Referring to FIG. 2, the anode 130 is made of graphite and has a hole formed from a surface facing the cathode. The inside of the hole is filled with a mixed powder 150 of graphite powder and boron powder. The anode 130 made of graphite is divided into a filled region 131 and a bulk region 132. The filled region 131 is composed of graphite defining the outer periphery of the hole and the mixed powder 150 filling the hole. In addition, the bulk region 132 has no hole and is entirely made of graphite. At the end of the filled region 131 of the anode 130, carbon vapor and boron vapor are generated by arc discharge. That is, a part of the graphite defining the periphery of the hole is evaporated to form carbon vapor, and a part of the mixed powder 150 is evaporated to form carbon vapor and boron vapor.

Preparation Example: Preparation of Boron-Doped Carbon Nanotubes

The atmosphere gas supplied to the process chamber is a mixed gas of nitrogen and oxygen, the mixed gas has a partial pressure ratio of 9:1, the flow is 100 sccm, and the pressure inside the process chamber is set to 120 torr. In addition, a voltage of 20 V to 25 V is applied between the anode and the cathode, and the supply current is set to 80 A during arc discharge.

The anode and the cathode are made of graphite, and the cross-sectional area of the cathode is set to be larger than the cross-sectional area of the anode. The diameter of the rod shape of the anode is 8 mm, and the amount of boron in the filled region 131 is converted into wt %. In the mixed powder filled in the anode, the boron powder has a range of 0.02 wt % to 0.13 wt % compared to the filled region. That is, the amount of boron powder in the mixed powder is calculated by converting the amount of boron from the sum of the portion filled in the hole and the graphite portion surrounding the hole. Hereinafter, the content of boron powder or the amount of boron filled in the anode indicates the amount of boron relative to the filled region, and all boron contents expressed in wt % mean the amount of boron relative to the amount of the entire filled region. The content of boron filled in the above-described anode needs to be understood as expressing the amount of boron with respect to the total amount of carbon vapor and boron vapor evaporated at the end of the anode in arc discharge generated for the formation of carbon nanotubes.

Figure 3:
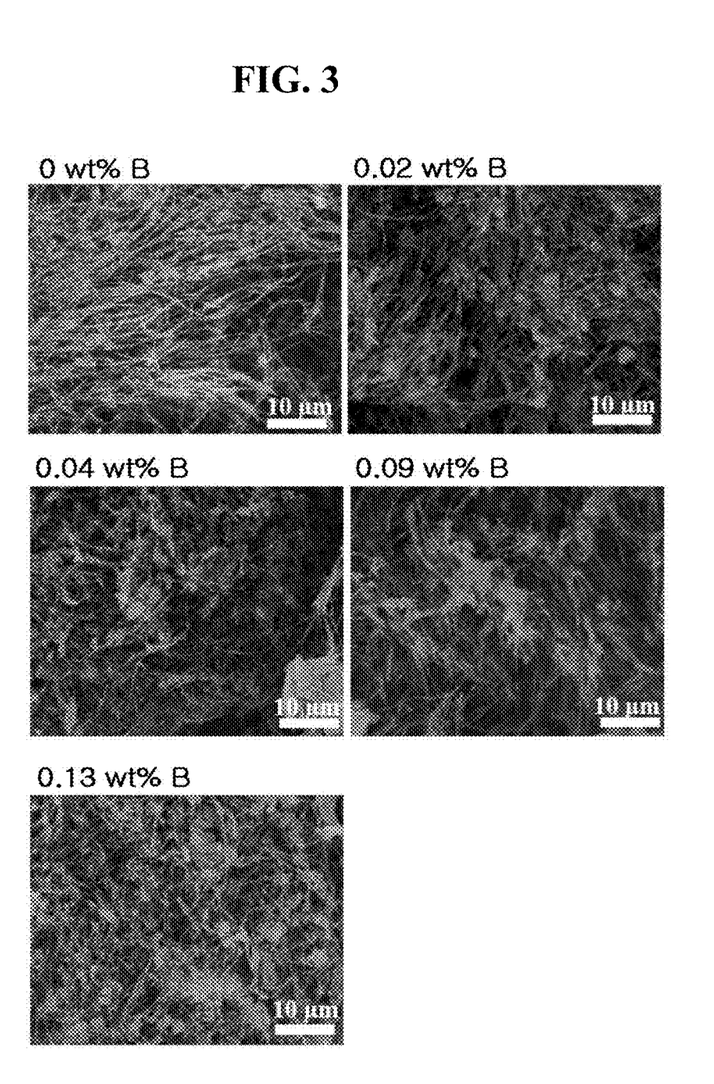
FIG. 3 is an SEM image of carbon nanotubes prepared according to the preparation example of the present inventive concept.

FIG. 3 is an SEM image of carbon nanotubes prepared according to the preparation example of the present inventive concept.

Referring to FIG. 3, the amount of boron filled in the anode is changed to 0 wt %, 0.02 wt %, 0.04 wt %, 0.09 wt %, and 0.13 wt %, and according to each changed amount of boron, multi-wall carbon nanotubes (MWCNTs) are synthesized. In the case of MWCNTs not containing boron, a relatively pure surface appears, but as the amount of boron increases, it is confirmed that foreign substances are attached to the surface. The present inventors speculate that as the content of boron increases, the carbonaceous impurity particles adhere to the surface of the MWCNTs.

Figure 4:
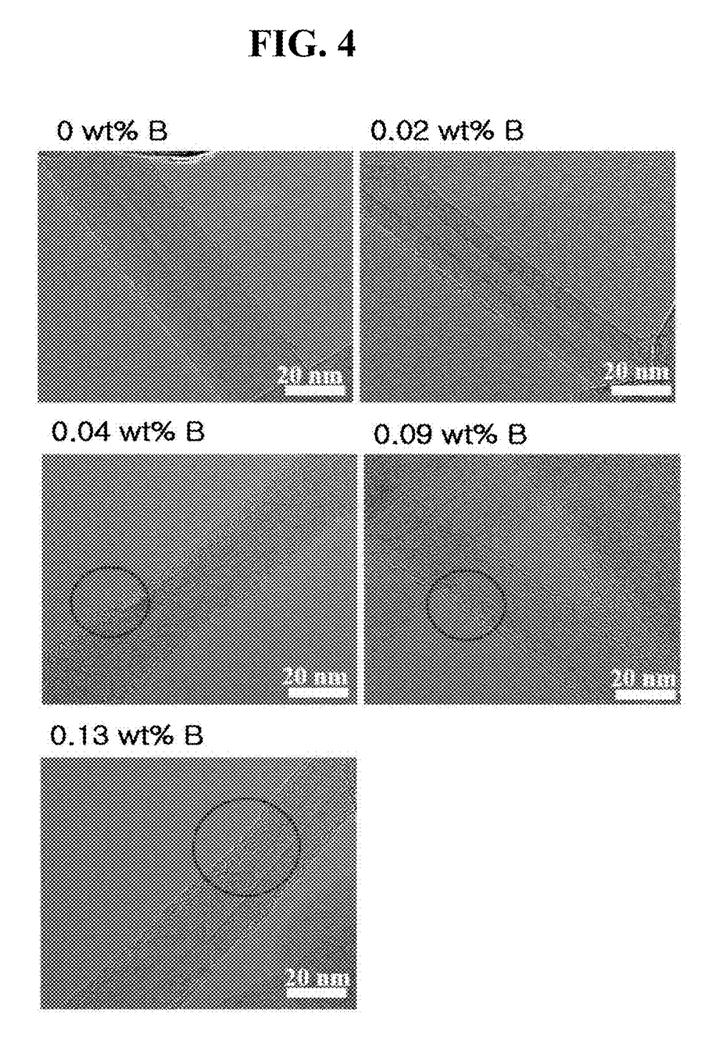
FIG. 4 is TEM images of MWCNTs prepared according to a preparation example of the present inventive concept.

FIG. 4 is TEM images of MWCNTs prepared according to a preparation example of the present inventive concept.

Referring to FIG. 4, the surfaces of the MWCNTs that do not contain boron and the MWCNTs formed by the anode which is filled with 0.02 wt % boron have a relatively smooth surface state. In addition, carbon nanotubes are empty in the inner cavity, and a plurality of graphene walls appear in a region between the inner cavity and the outer surface of carbon nanotubes.

Furthermore, it is confirmed that the outer diameter of the MWCNTs formed by filling the anode with boron at 0.02 wt % is reduced compared to the MWCNTs containing no boron at all. That is, it is confirmed that the outer diameter of the MWCNTs formed by doping boron through arc discharge is reduced. In addition, it is confirmed that the inner diameter of the boron-doped MWCNTs is increased compared to the MWCNTs not containing boron at all.

Figure 5:
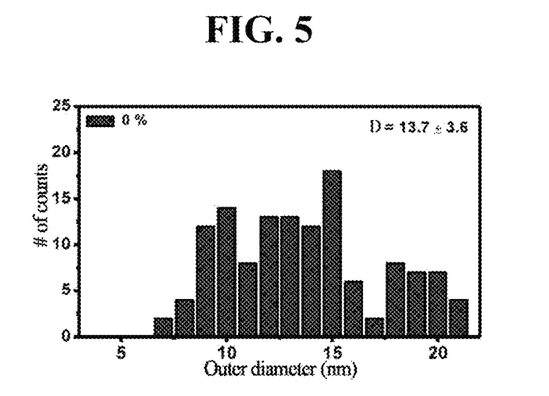
FIG. 5 is a graph of measuring the outer diameter of a MWCNTs not doped with boron according to a preparation example of the present inventive concept.

FIG. 5 is a graph of measuring the outer diameters of a MWCNTs not doped with boron according to a preparation example of the present inventive concept.

Referring to FIG. 5, no boron powder is included in the hole of the anode, and only graphite powder is filled. A plurality of MWCNTs are formed on the surface of the cathode shown in FIG. 1 through arc discharge. Therefore, the manufactured MWCNTs are a material that is not doped with boron. Due to the nature of the arc discharge, the outer diameters of the MWCNTs show a large deviation. For example, the outer diameters are distributed from about 7.3 nm to 21 nm. The average outer diameter measured for 100 carbon nanotubes is 13.7 nm, and the standard deviation is ±3.6 nm. That is, it can be seen that, while pure MWCNTs formed through arc discharge and not doped have a smooth surface profile, the outer diameters are different for individual nanotubes, and the deviation of the outer diameters is very large.

Figure 6:
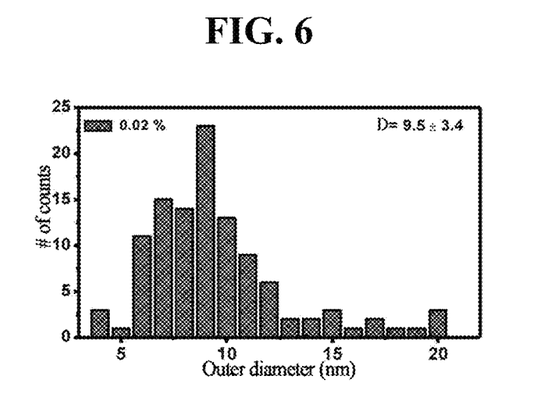
FIG. 6 is a graph of measuring the outer diameter of a MWCNTs doped with boron according to a preparation example of the present inventive concept.

FIG. 6 is a graph of measuring the outer diameter of a MWCNTs doped with boron according to a preparation example of the present inventive concept. As shown in FIGS. 1 and 2 of present embodiment, an anode filled with the mixed powder of graphite powder and boron powder at 0.02 wt % is used, and MWCNTs doped with boron on the surface of the cathode through arc discharge are formed. The outer diameters of each of the formed MWCNTs are measured.

Referring to FIG. 6, the formed MWCNTs have a distribution having an outer diameter of 4 nm to 20 nm. In addition, the average value of the outer diameter measured for 100 carbon nanotubes is 9.5 nm, and the standard deviation is ±3.4 nm.

In the 100 MWCNTs prepared without adding boron in FIG. 5, the outer diameters having a frequency of 10 or more are 9 nm to 15 nm. On the other hand, the outer diameters having a frequency of 10 or more for 100 MWCNTs prepared by doping with boron in FIG. 6 are 6 nm to 10 nm, confirming that the diameters are significantly reduced according to boron doping.

Figure 7:
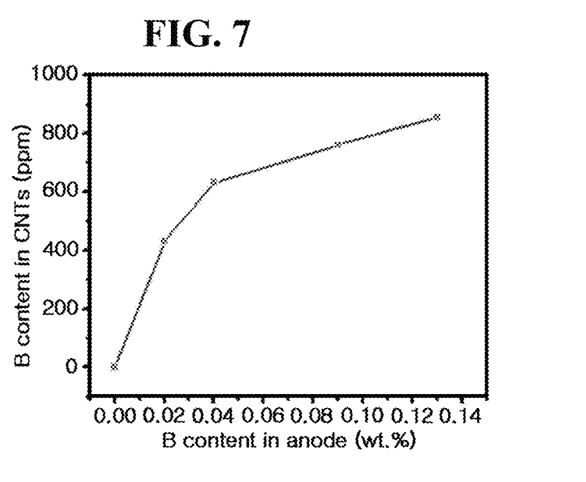
FIG. 7 is a graph showing the content of boron in the MWCNTs formed at the cathode compared to the content (wt %) of boron included in the anode according to the preparation example of the present inventive concept.

FIG. 7 is a graph showing the content of boron in the MWCNTs formed at the cathode compared to the wt % of boron included in the anode according to the preparation example of the present inventive concept.

Referring to FIG. 7, various wt % of boron mixed in the anode and corresponding concentration values of MWCNTs measured by ICP-AES (Inductively Coupled Plasma-Atomic Emission Spectrometer) are disclosed. The wt % of boron mixed in the anode shown in FIG. 7 and the concentration of boron in the MWCNTs are shown in detail in Table 1 below.

TABLE 1

| Content of boron in anode (wt %) | Concentration of boron in MWCNTs (ppm) |
| --- | --- |
| 0.02 | 431 |
| 0.04 | 630 |
| 0.09 | 761 |
| 0.13 | 855 |

When boron content is 0.02 wt % in the anode, a boron concentration of 431 ppm is observed in the MWCNTs. When the content of boron in the mixed powder increases as disclosed in FIG. 7, the concentration of boron in the MWCNTs also increases. However, the content of boron of the anode and the concentration of boron of carbon nanotubes are not in a linear relationship, and when the content of boron in the anode increases, the concentration of boron in the formed MWCNTs increases, but the increase trend is bent toward the saturation point. That is, when MWCNTs are synthesized by an arc discharge method, it is confirmed that there is a certain limit to the doping concentration of boron.

Figure 8:
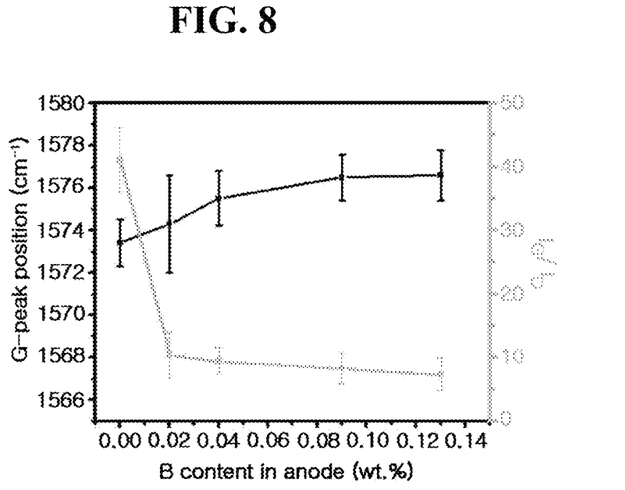
FIG. 8 is a Raman spectroscopic analysis result of the MWCNTs prepared according to the preparation example of the present inventive concept.

FIG. 8 is a Raman spectroscopic analysis result of the MWCNTs prepared according to the preparation example of the present inventive concept.

Referring to FIG. 8, the x-axis of Raman spectroscopy indicates the content of boron. However, the indication of the boron content on the x-axis is for convenience of explanation and needs to be interpreted by converting the concentration of boron contained in the MWCNTs, which should be understood with reference to Table 1. Although the G peak of the MWCNTs synthesized without boron addition is located at 1,573 cm$^{-1}$ on the Raman spectrum, the G peak position of the MWCNTs increases as the boron content of the anode increases. This appears to be due to the p-type doping of boron to the MWCNTs. The higher the crystallinity evaluation index $I_G/I_D$ on the Raman spectrum, the higher the crystallinity of the carbon nanotubes. The average $I_G/I_D$ of MWCNTs formed using the anode only of pure graphite is 41.1, which is high in crystallinity, but the average $I_G/I_D$ of boron-doped MWCNTs is 10.4 or less, indicating relatively low crystallinity. That is, it is observed that distortion of the crystal structure occurs due to doping of boron.

Figure 9:
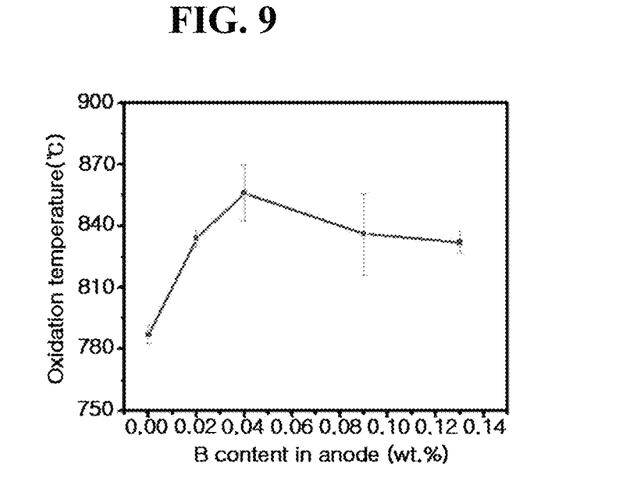
FIG. 9 is a graph comparing the oxidation peak temperatures of MWCNTs prepared according to preparation example of the present inventive concept.

FIG. 9 is a graph comparing the oxidation peak temperatures of MWCNTs prepared according to Preparation Example of the present inventive concept.

Referring to FIG. 9, oxidation peak temperature $T_{ox}$ indicates a temperature at which the slope of the TGA (thermogravimetric analysis) graph is the maximum through TGA. That is, the temperature at the point at which the oxidation rate is the fastest corresponds to the oxidation peak temperature $T_{ox}$. The average value of oxidation peak temperature $T_{ox}$ is 787° C. in the MWCNTs synthesized only with pure graphite anode. That is, oxidation is most activated at a relatively low temperature. However, when the content of boron in the anode is 0.02 wt % and 0.04 wt %, the formed boron-doped MWCNTs have high average value of oxidation peak temperatures $T_{ox}$ of 834° C. and 856° C., respectively. So, it is confirmed that the MWCNTs formed through arc discharge and boron doping have excellent thermal stability. That is, when boron is doped in a concentration range of about 431 ppm to 760 ppm in the carbon nanotubes, it has a high average value of oxidation peak temperature of 834° C. or more, and thermal stability is ensured. When boron or phosphorus (P) is adopted on the surface of carbon nanotubes, the thermal stability of carbon nanotubes is improved because boron or phosphorus acts as an antioxidant. Therefore, in this embodiment, it is confirmed that boron is doped in the lattice of the carbon nanotubes to improve the thermal stability of the carbon nanotubes.

Figure 10:
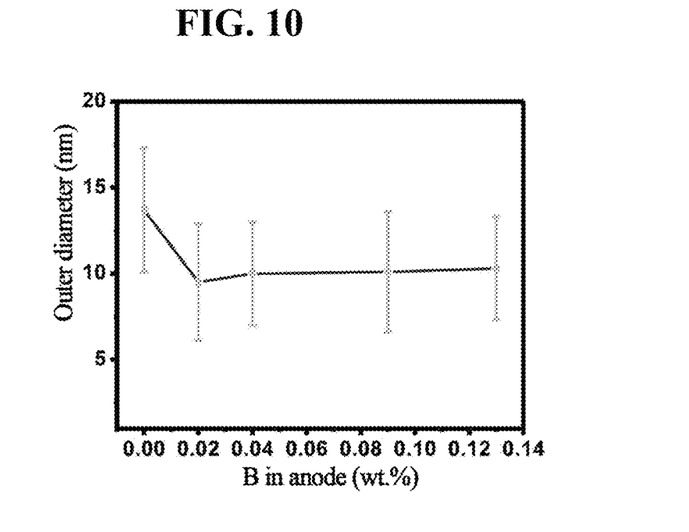
FIG. 10 is a graph comparing outer diameters of MWCNTs prepared according to preparation example of the present inventive concept.

FIG. 10 is a graph comparing outer diameters of MWCNTs prepared according to Preparation Example of the present inventive concept.

In FIG. 10, carbon nanotubes are synthesized under each condition in which boron is not added and the amount of boron added in the anode is gradually increased, and the outer diameters of respective 100 carbon nanotubes synthesized under each condition are measured using a transmission electron microscope and the average values of outer diameters are displayed.

Referring to FIG. 10, when boron is doped through arc discharge, it is confirmed that the outer diameters of the MWCNTs are reduced. That is, it is confirmed that the average outer diameter of the MWCNTs formed by arc discharge using the pure graphite anode without boron is about 13.7 nm. On the other hand, when the anode boron content is 0.02 wt %, the MWCNTs formed on the cathode have an average outer diameter of about 9.5 nm.

It is presumed that when MWCNTs are synthesized through arc discharge, boron atoms introduced in a substitutional form into the crystal structure of carbon nanotubes interfere with the growth of crystals. In addition, when the content of boron in the mixed powder increases, it is observed that the outer diameters of the formed MWCNTs slightly increase. That is, as the boron content increases to 0.04 wt %, 0.09 wt %, and 0.13 wt %, the average outer diameters of the MWCNTs increase to 10.0 nm, 10.1 nm, and 10.3 nm, respectively.

In addition, the MWCNTs not doped with boron show a standard deviation of ±3.6 nm, but when the boron content is 0.02 wt %, the MWCNTs show a standard deviation of ±3.4 nm. When the boron contents are increased to 0.04 wt %, 0.09 wt %, and 0.13 wt %, the average outer diameters of the MWCNTs slightly increase, but the standard deviations are ±3 nm, ±3.5 nm and ±3 nm, respectively. So, it is confirmed that the boron-doped carbon nanotubes have a reduced standard deviation compared to the undoped carbon nanotubes. In addition, the graph of FIG. 10 shows average outer diameters and standard deviations.

The increase of the outer diameters above 0.04 wt % boron conent may be inferred in connection with the decrease in the crystallinity evaluation index $I_G/I_D$ of FIG. 8. That is, when the content of boron is increased, the crystallinity of the synthesized MWCNTs is decreased, and the decrease in crystallinity causes a fine increase in the outer diameters. When the amorphous attribute of the crystal structure is increased in a single crystal, the additional amorphous synthesis may occur in the crystal structure due to the increase of defects rather than the synthesized crystal structure being dense. Through this, an increase in the boron content above 0.04 wt % appears as a slight increase in the outer diameters of carbon nanotubes.

Figure 11:
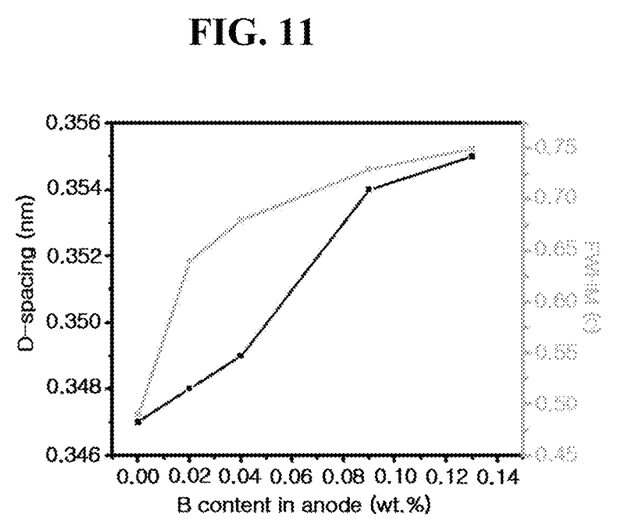
FIG. 11 is a graph showing data obtained from X-ray diffraction patterns for MWCNTs according to preparation example of the present inventive concept.

FIG. 11 is a graph showing data obtained from X-ray diffraction patterns for MWCNTs according to Preparation Example of the present inventive concept.

In FIG. 11, a graph comparing the full width at half maximum (FWHM) of the (002) peak and the spacing between adjacent walls constituting the MWCNTs is shown. The FWHM in FIG. 11 indicates the full width at half maximum of the X-ray diffraction pattern, and as the FWHM increases, the crystallinity of the carbon nanotube deteriorates.

Referring to FIG. 11, one MWCNT has 10 to 30 walls. Walls of a MWCNT can be confirmed in the TEM image of FIG. 4. That is, in FIG. 4, the center of the interior of the carbon nanotube is an empty space, and multi-walls are formed in a portion indicated in a dark color with a constant thickness. The spacing between adjacent walls constituting the multi-walls is measured in FIG. 11, and the spacing is denoted by D-spacing.

The D-spacing, which is the distance between walls in a MWCNT formed using the anode only of pure graphite, shows a value of about 0.347 nm. On the other hand, when boron is doped, the value of D-spacing increases. For example, when the boron contents are 0.02 wt %, 0.04 wt %, and 0.09 wt %, the D-spacing values have values of 0.348 nm, 0.349 nm, and 0.354 nm, respectively. The increase of D-spacing according to boron contents is due to the phenomenon that, during arc discharge, boron doping does not occur only on the outer wall of the MWCNTs, boron doping occurs evenly in the inner walls of MWCNTs, and boron doping causes distortion of the crystal structure.

In addition, while the FWHM of the (002) peak of the MWCNTs undoped with boron is 0.49°, and when the boron addition content of the anode increases, the FWHM of the (002) peak of the MWCNT steadily increases above 0.6° due to increase of amount of doped boron.

That is, it is confirmed through FIG. 11 that the inner walls of the MWCNTs are evenly doped with boron, and the crystallinity is somewhat reduced through the even doping of boron.

Figure 12:
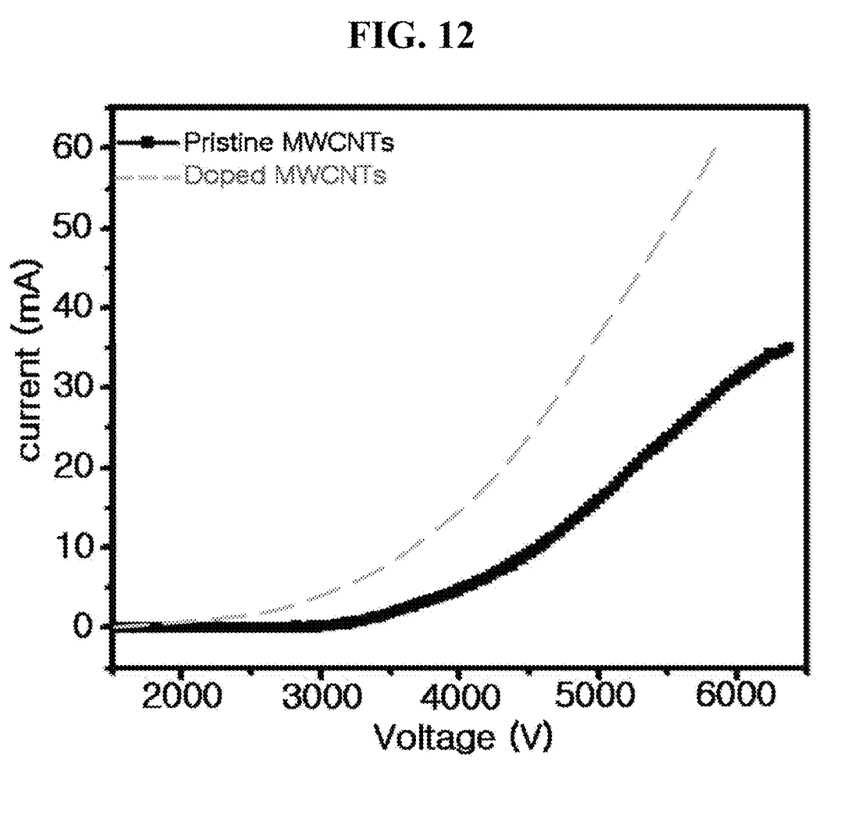
FIG. 12 is a graph showing field emission characteristics of MWCNTs manufactured according to a preparation example of the present inventive concept.

FIG. 12 is a graph showing field emission characteristics of MWCNTs manufactured according to a preparation example of the present inventive concept.

In FIG. 10, it is found that the average outer diameter of carbon nanotubes synthesized through arc discharge by adding 0.02 wt % of boron to the anode is the smallest. In FIG. 10, the outer diameter of the synthesized carbon nanotubes slightly increased even when the amount of boron added is increased above 0.04 wt %, but showed almost the same level. On the other hand, as the boron content in FIG. 3 exceeds 0.04 wt %, spherical carbon impurities are greatly increased. Since only one-dimensional carbon nanotubes, excluding spherical carbon impurities, can act as a field emission material, MWCNTs synthesized under conditions of 0.02 wt % to 0.04 wt % boron addition have small outer diameters and a small amount of impurities so that it appears to be the optimal material as field emission emitters. Therefore, in FIG. 12, the field emission characteristics of carbon nanotubes synthesized without adding boron at all and carbon nanotubes synthesized by adding boron in an amount of 0.02 wt % are compared.

Referring to FIG. 12, an electron emission device is manufactured. MWCNTs need to be fixed to an cathode electrode substrate. For fixation of the MWCNTs, a filler is used. The filler is composed of $Al_2O_3$, Ni and Si powder, and has a volume ratio of 1:1:2. In addition, the electron emission device has a plurality of circular unit emission sources, and in one unit emission source, a plurality of MWCNTs are erected with respect to the surface of the electrode substrate. The diameter of the unit emission source is 300 µm, and the electron emission device has 28 unit emission sources.

The distance between the cathode electrode substrate and the opposite anode electrode substrate to which the electric field is applied is 500 µm.

The graph of the dotted line in FIG. 12 shows that 0.02 wt % of boron is contained in the mixed powder filled in the anode, and MWCNTs formed on the surface of the cathode through arc discharge are used. In addition, the graph of the solid line shows the characteristics of the electron emission device using the MWCNTs containing no boron at all.

It can be seen that a device using boron-doped MWCNTs as an electron emission source is turned on at a low voltage and exhibits a high current. This is because boron is doped at a specific concentration to decrease the outer diameters of the MWCNTs, so that a high electric field is induced at the end of the carbon nanotubes even when the same voltage is applied. The phenomenon in which the electric field is concentrated at the end of the carbon nanotubes is explained by Equation 1, which is the following Fowler-Nordheim equation.

$$\ln\left(\frac{I}{V^2}\right) = \ln\left(A \cdot \alpha \frac{\beta^2}{\phi d^2}\right) - \frac{B\phi^{\frac{3}{2}} d}{\beta V} \quad \text{[equation 1]}$$

The $\phi$ is the work function (eV), proportional constants A and B have values of $1.54 \times 10^{-6}$ A·eV·V$^{-2}$ and $6.83 \times 10^7$ eV$^{-3/2}$·V·cm$^{-1}$, respectively. Also, $\alpha$ is an effective field emission area, $\beta$ is a field enhancement factor, and d is a distance between two electrodes (500 µm in present embodiment). From the Fowler-Nordheim equation, $\ln$ $$\left(\frac{I}{V^2}\right) \text{ and } \frac{1}{V}$$

can be expressed as a straight line relationship, and if the work function ($\phi$) is known, the $\beta$ value, which is an field enhancement factor, can be calculated from the slope of this straight line. Here, the field enhancement factor ($\beta$) indicates how strongly an externally applied electric field is enhanced on the emitter tip and is determined by the emitter geometry. The field enhancing factor ($\beta$) is expressed as $$\beta \cong \frac{\ell}{r}$$

by the radius (r) and length ($\ell$). According to the Fowler-Nordheim equation, in order to obtain a high emission current under a constant voltage, it should have a high field enhancement factor ($\beta$) and a low work function ($\phi$). Since carbon nanotubes have a fixed work function (~4.61 eV), the aspect ratio, which is the ratio of the length to the diameter, is very large and the field enhancing factor ($\beta$) has a high value, so that a high field emission current can be obtained even at a low voltage. So, carbon nanotubes are a very good field emission material.

The field enhancement factor obtained through the Fowler-Nordheim equation is 618 for the MWCNTs containing no boron, whereas the value of the carbon nanotubes synthesized by containing 0.02 wt % of boron in the anode is increased to 905. The higher the field enhancement factor, the higher the aspect ratio of the emitters. Here, the increase in the aspect ratio of the emitters is due to the decrease in the diameter of the carbon nanotubes synthesized by boron doping.

Figure 13:
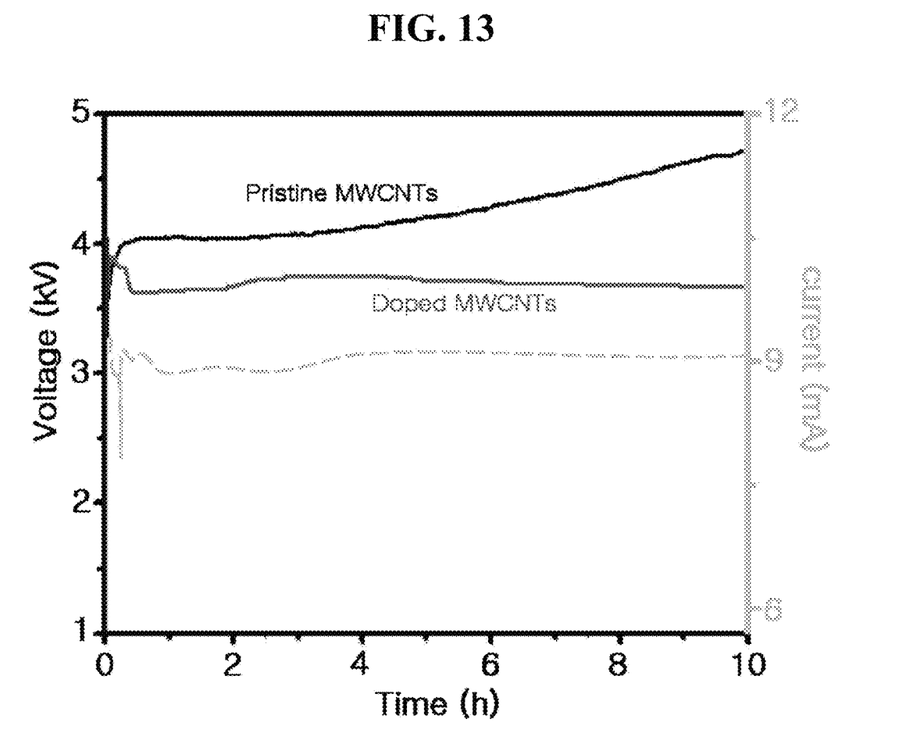
FIG. 13 is a graph showing the field emission lifetime characteristics of the MWCNTs manufactured according to the preparation example of the present inventive concept.

FIG. 13 is a graph showing the field emission lifetime characteristics of the MWCNTs manufactured according to the preparation example of the present inventive concept.

Referring to FIG. 13, the change in the anode voltage required to maintain a constant emission current of about 9 mA in a state where the distance between the emitter cathode electrode substrate and the opposite anode electrode substrate, which is a diode structure, is maintained at 500 µm is recorded.

The graph of dotted line in FIG. 13 represents the current emitted from the carbon nanotube emitters of the cathode. The graph labeled as "Doped MWCNTs" shows the voltage change of the emitters when MWCNTs synthesized by arc discharge at the anode containing 0.02 wt % of boron are used as emitters. In addition, the black graph shows the voltage change of the electron emitters using the MWCNTs containing no boron at all. The MWCNTs containing no boron showed a steady voltage increase, whereas the carbon nanotubes synthesized by adding 0.02 wt % of boron shows an almost constant voltage without any increase in voltage. This means that even if electrons whose current corresponds to 9 mA are continuously emitted for 10 hours, boron-doped carbon nanotubes are hardly damaged by electron emission.

Figure 14:
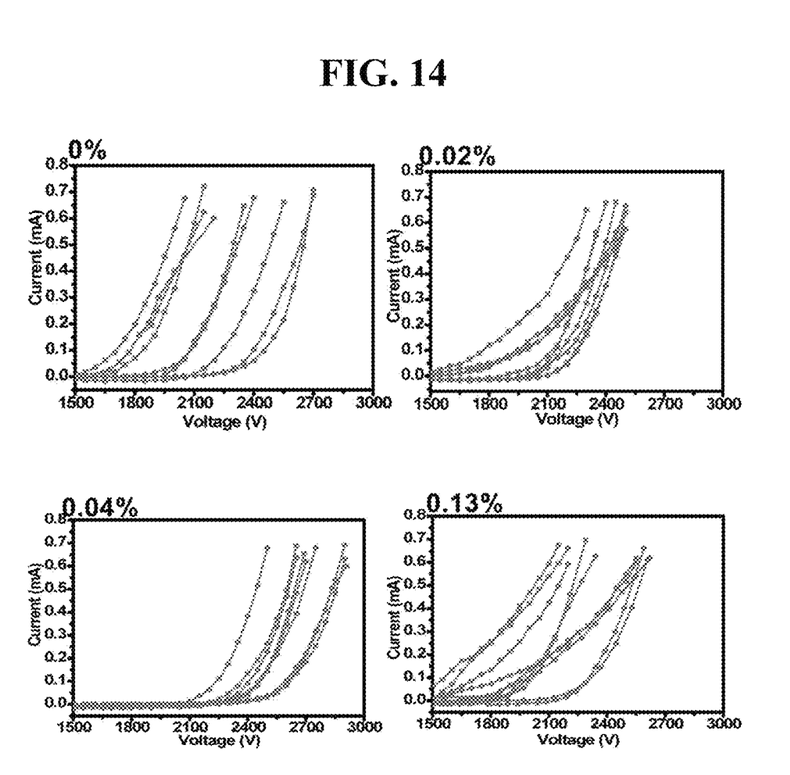
FIG. 14 is a graph illustrating field emission characteristics of MWCNTs measured to assess threshold voltages where a current of 0.5 mA is produced while varying the boron content during the synthesis of MWCNTs.

FIG. 14 is a graph illustrating field emission characteristics of electron emission devices manufactured while varying the boron content during the synthesis of MWCNTs. MWCNTs need to be fixed to an cathode electrode substrate. For this purpose, a filler is used. As fillers, 0.145 g of $Al_2O_3$, 0.21 g of Ni and 0.325 g of Si powder are used, and 0.66 g of MWCNTs is used. In addition, the electron emission device has a plurality of circular unit emission sources, and in one unit emission source, a plurality of MWCNTs are erected with respect to the surface of the electrode substrate. The diameter of the unit emission source is 260 µm, and the electron emission device has 25 unit emission sources.

The distance between the cathode electrode substrate and the opposite anode substrate to which the electric field is applied is 500 μm.

Referring to FIG. 14, a threshold voltage is defined as a voltage when a current is 0.5 mA by a field emission operation. It can be seen that when boron is not contained in the anode, the fluctuation range of the threshold voltages is very large. The standard deviation of the measured threshold voltages is 254.6 V. When boron is contained in an amount of 0.02 wt % in the anode, the fluctuation range of the threshold voltages is greatly reduced. The standard deviation of the measured threshold voltages is 68.5 V. When the boron content gradually increases to 0.04 wt %, the standard deviation representing the fluctuation range of the threshold voltages increases to 165 V. That is, it can be seen that as the content of boron increases, the fluctuation range and standard deviation of the threshold voltages also increase. In particular, when 0.13 wt % of boron is contained in the anode, the standard deviation of the threshold voltages further increases to reach 212.3 V.

In the electron emission device, it is required that the fluctuation range of the threshold voltages is small. In particular, if the standard deviation is a value of 200 V or more, it is difficult to control the voltage for electron emission. Therefore, in the present inventive concept, it is preferable that the positive electrode contains 0.02 wt % to 0.04 wt % of boron. When this is converted to the concentration of doped boron of the MWCNTs according to Table 1, boron is preferably doped at about 431 ppm to 630 ppm. Through this, the variation of the emission voltage of the manufactured electron emission device is reduced, and it is possible to secure uniform electron emission characteristics over a plurality of devices.

As described above, in the present inventive concept, boron is doped through arc discharge. Through arc discharge, the carbon source and boron source are simultaneously evaporated, and MWCNTs are formed on the surface of the cathode. Therefore, there is an advantage that the multi-walls are evenly doped with boron, and the outer diameters of the MWCNTs are reduced by controlling the growth of the multi-walls. Through the reduction of the outer diameters of the MWCNTs, the effect of lowering the applied voltage required to emit electrons can be obtained.

In addition, boron-doped MWCNTs have high thermal stability and electron emission at low turn-on voltages. In addition, when it is manufactured as an electron emission device, uniform emission characteristics may be secured. The technical advantages of the present inventive concept described above act as a great advantage in that the MWCNTs act as an electron emission source.

The invention claimed is:

1. A multi-walled carbon nanotube (MWCNT) doped with boron and having a reduced outer diameter compared to an undoped carbon nanotube, wherein the outer diameter of the doped MWCNT has a value of 4 nm to 20 nm, wherein the MWCNT has 10.4 or less as average crystallinity evaluation index on a Raman spectrum.

2. The MWCNT of claim 1, wherein an inner diameter of the MWCNT is increased compared to the undoped carbon nanotube.

3. The MWCNT of claim 1, wherein a concentration of the boron in the MWCNT is 431 ppm to 630 ppm.

4. The MWCNT of claim 1, wherein an average value of oxidation peak temperature of the MWCNT is 834° C. or more.

5. The MWCNT of claim 1, wherein an average value of the outer diameter is 9.5 nm to 10 nm.

6. The MWCNT of claim 1, wherein an interval between walls of the MWCNT is 0.348 nm to 0.349 nm.

7. The MWCNT of claim 1, wherein the MWCNT is synthesized by arc discharge.

8. The MWCNT of claim 1, wherein the boron is doped in a substitutional type, and the MWCNT has p-type conductivity.

9. A method of manufacturing a MWCNT comprising:
generating an arc discharge by applying a voltage between anode and cathode spaced apart from each other;
evaporating graphite powder to make carbon vapor and boron powder to make boron vapor at the anode close to the cathode by the arc discharge; and
forming boron-doped carbon nanotube by depositing the carbon vapor and the boron vapor on surface of the cathode,
wherein the anode and the cathode are made of graphite, and
wherein the anode comprises:
a filled region having a hole that is formed from a surface facing the cathode and is filled with a mixed powder of the graphite powder and the boron powder; and
a bulk region extending from the filled region,
wherein the boron powder has a content of 0.02 wt % to 0.04 wt % based on the sum of the mixed powder and the graphite surrounding the hole.

10. The method of claim 9, wherein the carbon vapor and the boron vapor are generated by the arc discharge at the end of the filled region.

11. The method of claim 9, wherein the graphite defining periphery of the hole of the filling region is evaporated to form the carbon vapor, and the mixed powder is evaporated to form the carbon vapor and the boron vapor.

12. The method of claim 9, wherein the carbon nanotube has multi-walls, and the boron is doped in the multi-walls at concentration of 431 ppm to 630 ppm.

* * * * *